United States Patent
Lin et al.

(10) Patent No.: US 9,716,884 B2
(45) Date of Patent: Jul. 25, 2017

(54) METHOD OF SIGNALING FOR MODE SELECTION IN 3D AND MULTI-VIEW VIDEO CODING

(71) Applicant: HFI Innovation Inc., Zhubei, Hsinchu County (TW)

(72) Inventors: Jian-Liang Lin, Su'ao Township (TW); Yi-Wen Chen, Taichung (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 198 days.

(21) Appl. No.: 14/620,500

(22) Filed: Feb. 12, 2015

(65) Prior Publication Data
US 2015/0271486 A1 Sep. 24, 2015

Related U.S. Application Data

(60) Provisional application No. 61/955,868, filed on Mar. 20, 2014, provisional application No. 61/971,920, filed on Mar. 28, 2014.

(51) Int. Cl.
*H04N 19/46* (2014.01)
*H04N 19/103* (2014.01)
(Continued)

(52) U.S. Cl.
CPC ......... *H04N 19/103* (2014.11); *H04N 19/597* (2014.11); *H04N 19/70* (2014.11); *H04N 19/46* (2014.11)

(58) Field of Classification Search
CPC .... H04N 19/103; H04N 19/46; H04N 19/597; H04N 19/70
(Continued)

(56) References Cited

U.S. PATENT DOCUMENTS

| 6,826,669 B1* | 11/2004 | Le ........................... H04L 69/22 370/254 |
| 2008/0089428 A1* | 4/2008 | Nakamura ........... H04N 19/597 375/240.26 |

(Continued)

OTHER PUBLICATIONS

Ma et al, Improved Segment-wise DC coding for HEVC Intra Prediction of Depth Maps, 2014.*

(Continued)

*Primary Examiner* — Shan Elahi
(74) *Attorney, Agent, or Firm* — McClure, Qualey & Rodack, LLP

(57) ABSTRACT

A method and apparatus for signaling one or more coding modes selected from a mode group for multi-view or three-dimensional (3D) video coding are disclosed. The mode group comprises a pulse code modulation (PCM) mode, a segment-wise depth coding (SDC) mode and a depth-based block partitioning (DBBP) mode. According to the present invention, a first mode is determined regarding whether it is enabled, where the first mode corresponds to one of at least two mode members selected from the PCM mode, the SDC mode and the DBBP mode. If the first mode is enabled, a first mode flag corresponding to the first mode is signaled to indicate whether the first mode is asserted. If the first mode is asserted, the current depth or texture block is coded using the first mode and signaling any remaining mode member of at least two mode members is skipped.

28 Claims, 5 Drawing Sheets

(51) Int. Cl.
*H04N 19/597* (2014.01)
*H04N 19/70* (2014.01)

(58) Field of Classification Search
USPC .................................................. 375/240.24
See application file for complete search history.

(56) References Cited

U.S. PATENT DOCUMENTS

| | | | | |
|---|---|---|---|---|
| 2012/0183066 A1* | 7/2012 | Oh | H04N 19/132 | 375/240.13 |
| 2012/0229602 A1* | 9/2012 | Chen | H04N 19/597 | 348/43 |
| 2013/0022111 A1* | 1/2013 | Chen | H04N 19/50 | 375/240.12 |
| 2013/0051475 A1* | 2/2013 | Joshi | H04N 19/159 | 375/240.18 |
| 2013/0064294 A1* | 3/2013 | Sole Rojals | H04N 19/176 | 375/240.12 |
| 2013/0114677 A1* | 5/2013 | Baylon | H04N 19/176 | 375/240.02 |
| 2013/0114678 A1* | 5/2013 | Baylon | H04N 19/176 | 375/240.02 |
| 2013/0114695 A1* | 5/2013 | Joshi | H04N 19/463 | 375/240.03 |
| 2013/0114730 A1* | 5/2013 | Joshi | H04N 7/30 | 375/240.18 |
| 2013/0114738 A1* | 5/2013 | Chien | H03M 7/4018 | 375/240.24 |
| 2013/0163662 A1* | 6/2013 | Haque | H04N 19/463 | 375/240.03 |
| 2013/0163664 A1* | 6/2013 | Guo | H04N 19/00793 | 375/240.12 |
| 2013/0177068 A1* | 7/2013 | Minoo | H04N 19/00127 | 375/240.02 |
| 2013/0177070 A1* | 7/2013 | Seregin | H04N 19/13 | 375/240.02 |
| 2013/0188688 A1* | 7/2013 | Panusopone | H04N 19/13 | 375/240.02 |
| 2013/0188741 A1* | 7/2013 | Minoo | H04N 19/00903 | 375/240.26 |
| 2013/0202026 A1* | 8/2013 | Fang | H04N 19/91 | 375/240.02 |
| 2013/0202037 A1* | 8/2013 | Wang | H04N 19/52 | 375/240.15 |
| 2013/0229485 A1* | 9/2013 | Rusanovskyy | H04N 13/0048 | 348/43 |
| 2013/0243081 A1* | 9/2013 | Chen | H04N 19/597 | 375/240.02 |
| 2013/0336395 A1* | 12/2013 | Joshi | H04N 19/176 | 375/240.12 |
| 2013/0342644 A1* | 12/2013 | Rusanovskyy | H04N 19/597 | 348/43 |
| 2014/0294061 A1* | 10/2014 | Zhang | H04N 19/00042 | 375/240.02 |
| 2014/0301454 A1* | 10/2014 | Zhang | H04N 13/0048 | 375/240.12 |
| 2014/0301463 A1* | 10/2014 | Rusanovskyy | H04N 19/52 | 375/240.14 |

OTHER PUBLICATIONS

Micallef et al, Improved Depth Maps Coding Efficiency of 3D Videos, Aug. 27-31, 2012.*
Zhao et al, Low-Complexity Encoding Techniques for Multiview Video, 2013.*
Ma et al, Improved Segment-wise DC coding for HEVC Intra Prediction of Detph Maps, 2014.*

* cited by examiner

METHOD OF SIGNALING FOR MODE SELECTION IN 3D AND MULTI-VIEW VIDEO CODING

CROSS REFERENCE TO RELATED APPLICATIONS

The present invention claims priority to U.S. Provisional Patent Application, Ser. No. 61/955,868, filed on Mar. 20, 2014, entitled "Method of Signaling for PCM, SDC, and DBBP Modes in 3-D and Multiview Video Coding" and U.S. Provisional Patent Application, Ser. No. 61/971,920, filed on Mar. 28, 2014, entitled "Method for Additional Modes Signaling in Three-Dimensional and Multi-View Video Coding". The U.S. Provisional Patent Applications are hereby incorporated by reference in their entireties.

FIELD OF THE INVENTION

The present invention relates to three-dimensional (3D) and multi-view video coding. In particular, the present invention relates to signaling for mode selection including two or more modes selected from PCM (pulse code modulation) mode, SDC (segment-wise depth coding) mode and DBBP (depth-based block partitioning) mode.

BACKGROUND AND RELATED ART

Three-dimensional (3D) television has been a technology trend in recent years that intends to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the 3D video is capable of offering arbitrary viewpoints of dynamic scenes and provides viewers the sensation of realism.

To reduce the inter-view redundancy, disparity-compensated prediction (DCP) has been used as an alternative to motion-compensated prediction (MCP). MCP refers to an inter-picture prediction that uses already coded pictures of the same view in a different access unit, while DCP refers to inter-picture prediction that uses already coded pictures of other views in the same access unit, as illustrated in FIG. 1. The three-dimensional/multi-view data consists of texture pictures (110) and depth maps (120). The motion compensated prediction is applied to texture pictures or depth maps in the temporal direction (i.e., the horizontal direction in FIG. 1). The disparity compensated prediction is applied to texture pictures or depth maps in the view direction (i.e., the vertical direction in FIG. 1). The vector used for DCP is termed disparity vector (DV), which is analog to the motion vector (MV) used in MCP.

3D-HEVC is an extension of HEVC (High Efficiency Video Coding) that is being developed for encoding/decoding 3D video. One of the views is referred to as the base view or the independent view. The base view is coded independently of the other views as well as the depth data. Furthermore, the base view is coded using a conventional HEVC video coder.

In 3D-HEVC, a hybrid block-based motion-compensated DCT-like transform coding architecture is still utilized. The basic unit for compression, termed coding unit (CU), is a 2N×2N square block, and each CU can be recursively split into four smaller CUs until the predefined minimum size is reached. Each CU contains one or multiple prediction units (PUs). The PU size can be 2N×2N, 2N×N, N×2N, or N×N. When asymmetric motion partition (AMP) is supported, the PU size can also be 2N×nU, 2N×nD, nL×2N and nR×2N. The coding unit (CU) syntax related to the PCM (pulse code modulation) mode and SDC (segment-wise depth coding) mode is shown in Table 1.

TABLE 1

| coding_unit( x0, y0, log2CbSize , ctDepth) { | Descriptor |
|---|---|
| .... | |
| if( depth_based_blk_part_flag[ nuh_layer_id ] && | |
|   PartMode == PART_2N×N ) | |
|   dbbp_flag[ x0 ][ y0 ] | u(1) |
| if( sdcEnableFlag ) | |
|   sdc_flag[ x0 ][ y0 ] | ae(v) |
| if( CuPredMode[ x0 ][ y0 ] == MODE_INTRA ) { | |
|   if( PartMode == PART_2N×2N && | |
|   pcm_enabled_flag && | |
|     log2CbSize >= Log2MinIpcmCbSizeY && | |
|     log2CbSize <= Log2MaxIpcmCbSizeY ) | |
|   pcm_flag[ x0 ][ y0 ] | ae(v) |
| .... | |

As shown in Table 1, the SDC flag, sdc_flag[x0][y0] is incorporated if the SDC enable flag (i.e., sdcEnableFlag) is asserted. Furthermore, the PCM flag, pcm_flag[x0][y0] is incorporated if the CU is coded in an Intra mode (i.e., CuPredMode[x0][y0]==MODE_INTRA), PCM enable flag (i.e., pcm_enabled_flag) is asserted, and some block size conditions are satisfied. The mode enable flag is an indication regarding whether the corresponding mode is allowed. If the mode enable flag is asserted, it means that the corresponding mode is allowable. In this case, a further mode flag is signaled to indicate whether this mode is applied to an underlying image processing unit such as a coding unit (CU). For example, the SDC flag (i.e., sdc_flag [x0][y0]) is signaled when the SDC enable flag (i.e., sdcEnableFlag) is asserted. Otherwise, the SDC flag is not signaled. Furthermore, an underlying image processing unit is coded using SDC mode when the SDC flag (i.e., sdc_flag [x0][y0]) is asserted. If the SDC flag is not asserted, the SDC coding is not applied to the underlying image processing unit.

The coding unit extension syntax is a place to include some newly added features to the coding standard. The coding unit extension syntax design according to the conventional approach is shown in Table 2.

TABLE 2

| cu_extension( x0 , y0 , log2CbSize ) { | Descriptor |
|---|---|
| if ( icEnableFlag ) | |
|   ic_flag | ae(v) |
| if ( rpEnableFlag ) | |
|   iv_res_pred_weight_idx | ae(v) |
|   .... | |
| } | |

As shown in Table 2, the existing coding unit extension syntax incorporates illumination compensation flag (i.e., ic_flag) when illumination compensation enable flag (i.e., icEnableFlag) is asserted. In other words, if icEnableFlag is 1 specifies that ic_flag is present in the coding unit. If icEnableFlag is 0 specifies that ic_flag is not present in the coding unit. The weight index for inter-view residual prediction (i.e., iv_res_pred_weight_idx) is incorporated when the residual prediction enable flag (i.e., rpEnableFlag) is asserted. None of the SDC flag, the PCM flag and DBBP flag is incorporated in the coding unit extension syntax.

The 3D video is typically created by capturing a scene using video camera with an associated device to capture depth information or using multiple cameras simultaneously, where the multiple cameras are properly located so that each camera captures the scene from one viewpoint. The texture data and the depth data corresponding to a scene usually exhibit substantial correlation. Therefore, the depth information can be used to improve coding efficiency or reduce processing complexity for texture data, and vice versa. For example, the corresponding depth block of a texture block reveals similar information corresponding to the pixel level object segmentation. Therefore, the depth information can help to realize pixel-level segment-based motion compensation. Accordingly, a depth-based block partitioning (DBBP) has been adopted for texture video coding in the current 3D-HEVC (3D video coding based on the High Efficiency Video Coding (HEVC) standard).

In the depth-based block partitioning (DBBP) mode, arbitrarily shaped block partitioning for the collocated texture block is derived based on a binary segmentation mask computed from the corresponding depth map. Each of the two partitions (resembling foreground and background) is motion compensated and merged afterwards based on the depth-based segmentation mask.

A single flag is added to the coding syntax to signal to the decoder that the underlying block uses DBBP for prediction. When current coding unit is coded with the DBBP mode, the corresponding partition size is set to SIZE_2N×2N and bi-prediction is inherited.

A disparity vector derived from the DoNBDV (Depth-oriented Neighboring Block Disparity Vector) process is applied to identify a corresponding depth block in a reference view as shown in FIG. 2. In FIG. 2, corresponding depth block 220 in a reference view for current texture block 210 in a dependent view is located based on the location of the current texture block and derived DV 212, which is derived using DoNBDV according to 3D-HEVC standard. The corresponding depth block has the same size as current texture block. When the depth block is found, a threshold is calculated based on the average of all depth pixels within the corresponding depth block. Afterwards, a binary segmentation mask m_D (x,y) is generated based on depth values and the threshold. When the depth value located at the relative coordinator (x, y) is larger than the threshold, the binary mask m_D (x,y) is set to 1. Otherwise, m_D (x,y) is set to 0. An example is shown in FIG. 3. The mean value of the virtual block (310) is determined in step 320. The values of virtual depth samples are compared to the mean depth value in step 330 to generate segmentation mask 340. The segmentation mask is represented in binary data to indicate whether an underlying pixel belongs to segment 1 or segment 2, as indicated by two different line patterns in FIG. 3

The DoNBDV process enhances the NBDV by extracting a more accurate disparity vector from the depth map. The NBDV is derived based on disparity vector from neighboring blocks. The disparity vector derived from the NBDV process is used to access depth data in a reference view. A final disparity vector is then derived from the depth data.

The DBBP process partitions the 2N×2N block into two partitioned block. A motion vector is determined for each partition block. In the decoding process, each of the two decoded motion parameters is used for motion compensation performed on a whole 2N×2N block. The resulting prediction signals, i.e., p_T0 (x,y) and p_T1 (x,y) are combined using the DBBP mask m_D (x,y), as depicted in FIG. 4. The combination process is defined as follows $$p\_T(x, y) = \begin{cases} p\_T0(x, y), & \text{if } m\_D(x, y) = 1 \\ p\_T1(x, y), & \text{otherwise} \end{cases} \quad (1)$$

Whether the DBBP mode is used is signaled on coding unit as shown in Table 1. In currently design, the DBBP flag (i.e., dbbp_flag[x0][y0]) is conditionally signaled depended on a transmitted partition mode (i.e., PartMode). The DBBP flag is signaled only when the transmitted PartMode equals to 2N×N partition (i.e., PartMode==PART_2N×N).

The SDC approach provides an alternative residual coding method. With SDC, the residual data (one or two constant residual values within one PU) is coded without transform and quantization processes. Whether SDC is used is signaled in the coding unit parameters structure at PU level. The partition size of CU containing a SDC coded PU is always 2N×2N. SDC can be applied to depth data coded using all Intra prediction modes including HEVC Intra prediction modes and depth modelling modes (DMMs). For HEVC Intra prediction modes, the entire PU is considered as one segment. For DMM modes, the PU is divided into two segments.

In FIG. 4, the two prediction blocks are merged into one on a pixel by pixel basis according to the segmentation mask and this process is referred as bi-segment compensation. In this example, the N×2N block partition type is selected and two corresponding motion vectors (MV1 and MV2) are derived two partitioned blocks respectively. Each of the motion vectors is used to compensate a whole texture block (410). Accordingly, motion vector MV1 is applied to texture block 420 to generate prediction block 430 according to motion vector MV1, and motion vector MV2 is applied to texture block 420 also to generate prediction block 432 according to motion vector MV2. The two prediction blocks are merged by applying respective segmentation masks (440 and 442) to generate the final prediction block (450).

Before coding, the residual values are mapped to values, which are present in the original, uncompressed depth map by using a Depth Lookup Table (DLT). Consequently, residual values can be coded by signaling only the index into this lookup table, which reduces the bit depth of residual magnitudes. This mapping table is transmitted to the decoder for the inverse lookup from an index to a valid depth value. The advantage of using this lookup table is the reduced bit depth of the residual index due to sparse depth value occurrences in typical depth maps.

At encoder side SDC process utilizes the mean of the original depth value ($d_{orig}$) and the predicting depth value ($d_{pred}$). As illustrated in the example of FIG. 5A, for SDC (i.e., HEVC Intra prediction modes), $d_{pred}$ is calculated as the average of the left-top, right-top, left-bottom, and right-bottom samples (indicated by circles) in a predicted block. FIG. 5B illustrates an example of DMM Mode 1, where the upper left portion belongs to one segment and the lower-right portion (as indicated by slant lines) belongs to another segment. For SDC (DMM Mode 1), $d_{pred}$ of each segment is derived by the left-top, right-top, left-bottom, and right-bottom samples by (indicated circles) which belong to the same segment in a predicted block. While for SDC (DMM Mode 4), $d_{pred}$ of each segment is set equal to any sample which belongs to the same segment in a predicted block. This is because all samples within one segment share one same prediction value.

BRIEF SUMMARY OF THE INVENTION

A method and apparatus for signaling one or more coding modes selected from a mode group for multi-view or three-dimensional (3D) video coding are disclosed. The mode group comprises a pulse code modulation (PCM) mode, a segment-wise depth coding (SDC) mode and a depth-based block partitioning (DBBP) mode. According to the present invention, a first mode is determined regarding whether it is enabled, where the first mode corresponds to one of at least two mode members selected from the PCM mode, the SDC mode and the DBBP mode. If the first mode is enabled, a first mode flag corresponding to the first mode is signaled to indicate whether the first mode is asserted. If the first mode is asserted as indicated by the first mode flag, the current depth or texture block is coded using the first mode and signaling any remaining mode member of at least two mode members is skipped.

The current depth or texture block may correspond to a current depth or texture coding unit (CU). In one embodiment, said at least two mode members correspond to the PCM mode and the SDC mode. The first mode may correspond to the SDC mode, which can be signaled in coding unit (CU) syntax. In this case, a second mode flag corresponding to the PCM mode can be signaled in the CU syntax if the PCM mode is enabled and the first mode flag is not asserted. The first mode may also correspond to the PCM mode, which can be signaled in coding unit (CU) syntax. In this case, a second mode flag corresponding to the SDC mode can be signaled in CU extension syntax if the SDC mode is enabled and the first mode flag is not asserted. The current depth or texture block may also correspond to a coding tree block (CTB), a coding tree unit (CTU), a coding unit (CU) or a prediction unit (PU).

While said at least two mode members correspond to the PCM mode and the SDC mode, said at least two mode members may also correspond to other combinations. For example, said at least two mode members may correspond to the DBBP mode and the SDC mode, the DBBP mode and the PCM mode, or all three modes, i.e., the SDC mode, the PCM mode and the DBBP mode. When said at least two mode members correspond to all three modes, the first mode may correspond to the PCM mode and the first mode flag is signaled in coding unit syntax. Then, a SDC mode flag can be signaled in CU extension syntax if the first mode flag is not asserted and the SDC mode is enabled. Furthermore, a DBBP mode flag can be signaled in the CU extension syntax if the current depth or texture block is not Intra coded. Alternatively, the DBBP mode flag can be signaled in the CU extension syntax if the current depth or texture block is not Intra coded and the SDC mode flag is not asserted.

In another embodiment, said at least two mode members include the DBBP mode, and a DBBP mode enable flag is signaled in video parameter set (VPS), picture parameter set (PPS) or sequence parameter set (SPS).

BRIEF DESCRIPTION OF THE DRAWINGS

Figures 5A, 5B:
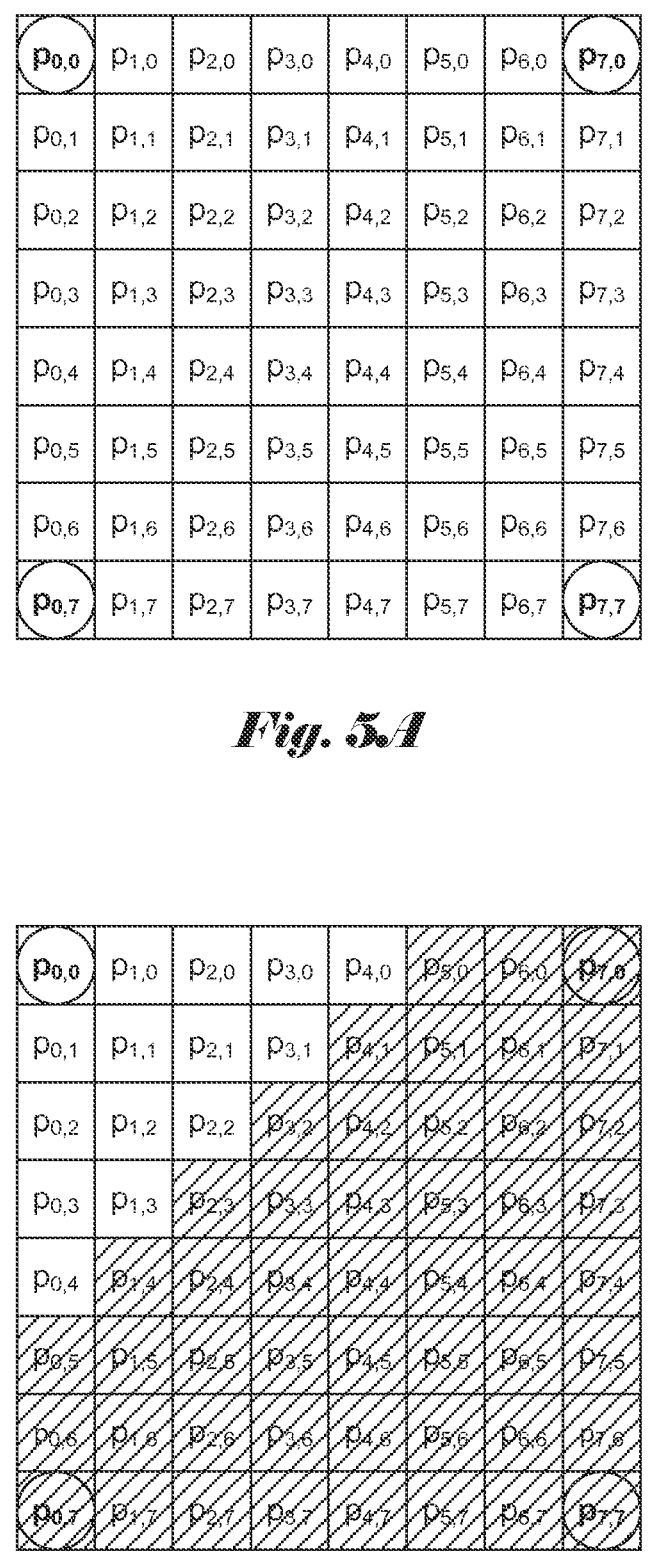

FIG. 5A illustrates an example of HEVC (High Efficient Video Coding) Intra prediction mode for an 8×8 block.

FIG. 5B illustrates an example of DMM (Depth Modeling Mode) Intra prediction mode for an 8×8 block.

DETAILED DESCRIPTION OF THE INVENTION

Figure 1:
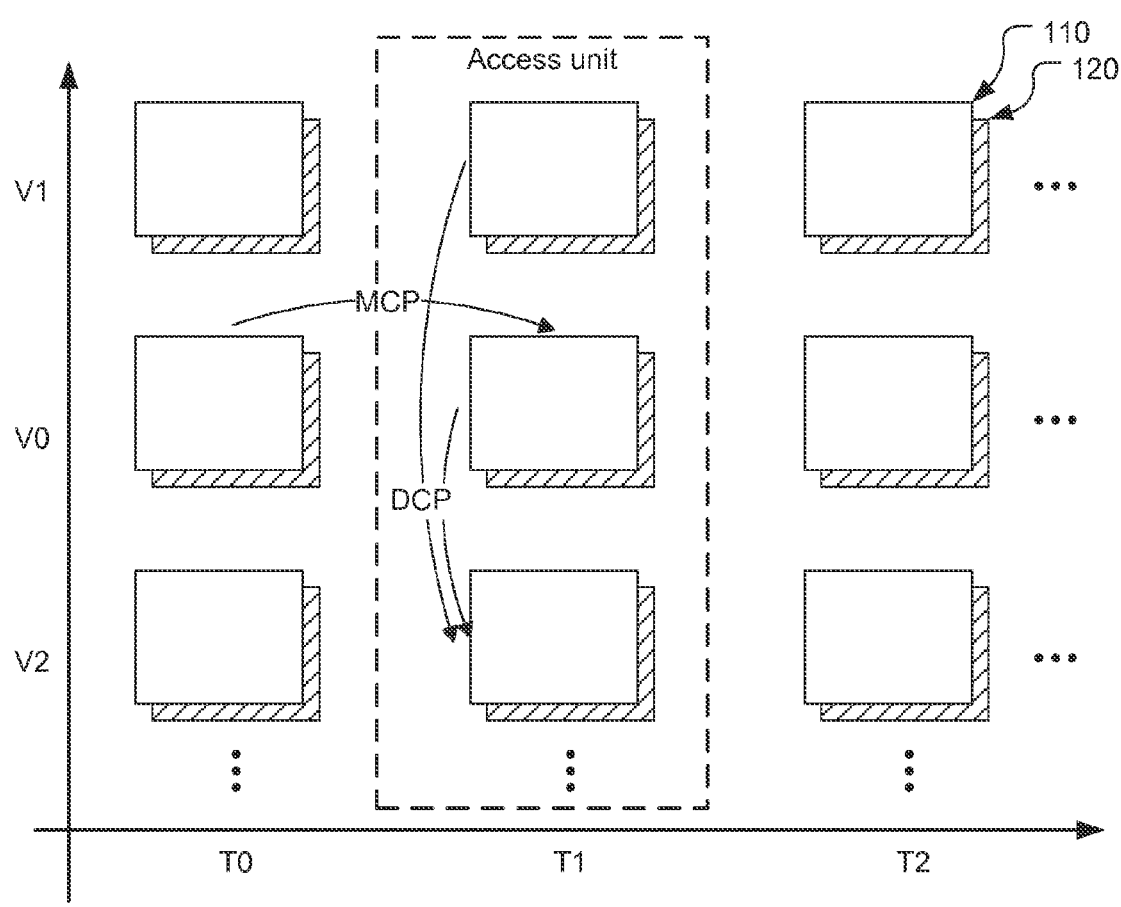
FIG. 1 illustrates an example of three-dimensional/multi-view coding, where motion compensated prediction (MCP) and disparity compensated prediction (DCP) are used
Figure 2:
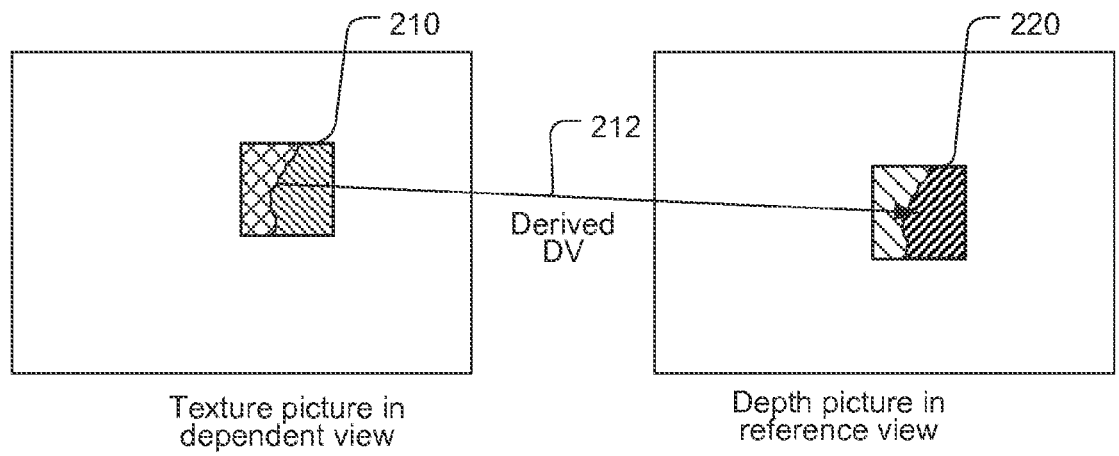
FIG. 2 illustrates an exemplary derivation process to derive a corresponding depth block in a reference view for a current texture block in a dependent view.
Figure 3:
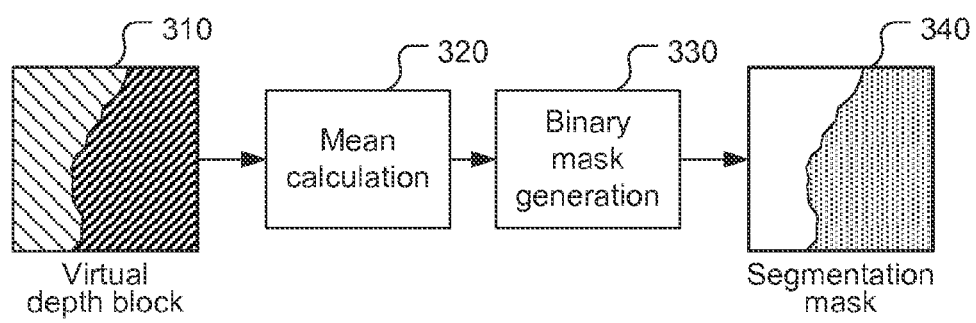
FIG. 3 illustrates an exemplary derivation process to generate the segmentation mask based on the corresponding depth block in a reference view for a current texture block in a dependent view.
Figure 4:
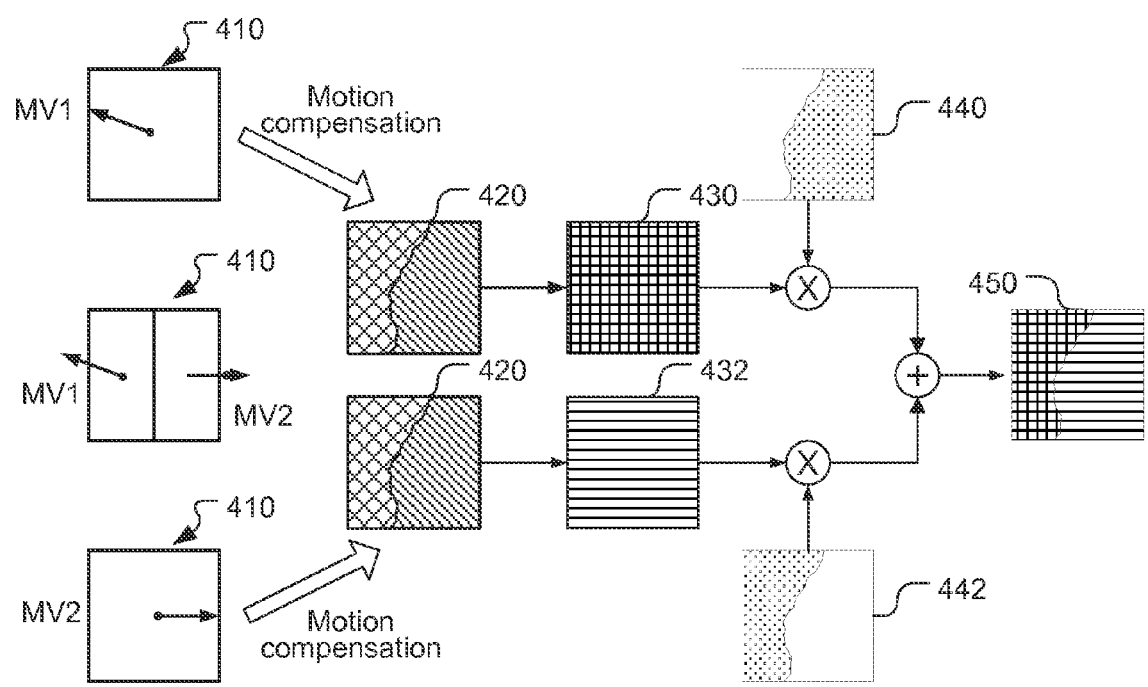
FIG. 4 illustrates an exemplary processing flow for 3D or multi-view coding using depth-based block partitioning (DBBP).

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In the multi-view and 3D video coding, various coding modes such as the pulse code modulation (PCM) mode, the segment-wise depth coding (SDC) mode and the depth-based block partitioning (DBBP) mode may be used. The mode or modes used usually are controlled using a mode enable indication. If the mode enable indication indicates that the mode is enabled, i.e., allowable, a corresponding mode flag is signaled to indicate whether the corresponding mode is applied to an underlying block. The present invention discloses efficient mode signaling method to avoid redundant mode signaling and/or to improve coding efficiency.

In the first embodiment of the present invention, the PCM mode flag, pcm_flag[x0][y0] is signaled only when the SDC mode is not enabled. An example of coding unit syntax design to support the first embodiment is shown in Table 3.

TABLE 3

| coding_unit( x0, y0, log2CbSize , ctDepth) { | Descriptor | Note |
|---|---|---|
| .... | | |
| if( depth_based_blk_part_flag[ nuh_layer_id ] | | |
|   && PartMode == PART_2N×N) | | |
|     dbbp_flag[ x0 ][ y0 ] | u(1) | |
| if( sdcEnableFlag ) | | |
|   sdc_flag[ x0 ][ y0 ] | ae(v) | |
| if( CuPredMode[ x0 ][ y0 ] == | | |
|   MODE_INTRA ) { | | |
|   if( PartMode == PART_2N×2N && | | (3-1) |
|     pcm_enabled_flag && | | |
|     ! sdc_flag[ x0 ][ y0 ] && | | |
|     log2CbSize >= Log2MinIpcmCbSizeY && | | |
|     log2CbSize <= Log2MaxIpcmCbSizeY ) | | |
|     pcm_flag[ x0 ][ y0 ] | ae(v) | |
| .... | | |

Compared to the conventional coding unit syntax design in Table 1, the embodiment in Table 3 according to the present invention includes an additional condition for incorporating the PCM mode flag (i.e., pcm_flag[x0][y0]). The additional condition corresponds to the SDC mode flag being not asserted (i.e., !sdc_flag[x0][y0] in the "if" statement) as noted in statement (3-1).

In the second embodiment, the SDC mode flag (i.e., sdc_flag[x0][y0]) is signaled in the CU extension syntax, where the SDC mode flag is signaled as noted in statement (4-2) only when the PCM mode flag is not asserted (i.e., !pcm_flag[x0][y0] in "if(sdcEnableFlag && !pcm_flag[x0][y0])") and the SDC enable flag is asserted (i.e., sdcEnableFlag in "if(sdcEnableFlag && !pcm_flag[x0][y0])") as noted in statement (4-1). An example of coding unit extension syntax design to support the second embodiment is shown in Table 4. Alternatively, the condition "!pcm_flag[x0][y0]" may be removed from statement (4-1) so that the SDC mode flag is always incorporated if the SDC enable flag is asserted.

TABLE 4

| cu_extension( x0 , y0 , log2CbSize ) { | Descriptor | Note |
|---|---|---|
| if ( icEnableFlag ) | | |
|   ic_flag | ae(v) | |
| if ( rpEnableFlag ) | | |
|   iv_res_pred_weight_idx | ae(v) | |
| if( sdcEnableFlag && !pcm_flag[ x0 ][ y0 ] ) | | (4-1) |
|   sdc_flag[ x0 ][ y0 ] | ae(v) | (4-2) |
| .... | | |
| } | | |

In the third embodiment of the present invention, the DBBP mode flag (i.e., dbbp_flag[x0][y0]) is signaled in the CU extension syntax. The DBBP mode flag can be skipped when the DBBP mode is disabled in the current slice, picture, view, layer, or sequence level, or the current CU mode is Intra mode or non-Inter mode, or the PCM mode is enabled. An example of the CU extension syntax design according to the third embodiment is shown in Table 5.

TABLE 5

| cu_extension( x0 , y0 , log2CbSize ) { | Descriptor | Note |
|---|---|---|
| if ( icEnableFlag ) | | |
|   ic_flag | ae(v) | |

TABLE 5-continued

| cu_extension( x0 , y0 , log2CbSize ) { | Descriptor | Note |
|---|---|---|
| if ( rpEnableFlag ) | | |
|   iv_res_pred_weight_idx | ae(v) | |
| if( depth_based_blk_part_flag[ nuh_layer_id ] | | (5-1) |
|   && CuPredMode[ x0 ][ y0 ] != | | |
|   MODE_INTRA) | | |
|   dbbp_flag[ x0 ][ y0 ] | ae(v) | (5-2) |
| .... | | |
| } | | |

In Table 5, when depth based block partitioning is used for the layer, nuh_layer_id (i.e., depth_based_blk_part_flag [nuh_layer_id] being asserted) and the CU prediction mode is not Intra mode as noted in statement (5-1), then the DBBP mode flag is incorporated in the CU extension syntax as noted in statement (5-2). Alternatively, the condition "!CuPredMode[x0][y0] !=MODE_INTRA)" may be removed from statement (5-1) so that the DBBP flag is always incorporated if depth_based_blk_part_flag[nuh_layer_id] is asserted.

In the fourth embodiment of the present invention, both the SDC mode flag and DBBP mode flag are signaled in the CU extension syntax. The SDC mode flag is signaled only when the PCM mode is not enabled. The DBBP mode flag can be skipped when the DBBP mode is disabled in current slice, picture, view, layer, or sequence level, or the current CU mode is Intra mode or non-Inter mode, or the PCM mode is enabled. An example of the CU extension syntax design is shown in Table 6. In Table 6, the SDC mode flag is signaled only when the PCM mode is not enabled as noted in statements (6-1) and (6-2). The DBBP flag is signaled as noted in statement (6-4) when the conditions in statement (6-3) are satisfied. Again, in an alternative approach, both the condition "!pcm_flag[x0][y0]" and the condition "!CuPredMode[x0][y0] !=MODE_INTRA)" may be removed from Table 6 for the SDC mode flag and the DBBP mode flag respectively.

TABLE 6

| cu_extension( x0 , y0 , log2CbSize ) { | Descriptor | Note |
|---|---|---|
| if ( icEnableFlag ) | | |
|   ic_flag | ae(v) | |
| if ( rpEnableFlag ) | | |
|   iv_res_pred_weight_idx | ae(v) | |
| if( sdcEnableFlag && !pcm_flag[ x0 ][ y0 ] ) | | (6-1) |
|   sdc_flag[ x0 ][ y0 ] | ae(v) | (6-2) |
| if( depth_based_blk_part_flag[ nuh_layer_id ] | | (6-3) |
|   && CuPredMode[ x0 ][ y0 ] != | | |
|   MODE_INTRA) | | |
|   dbbp_flag[ x0 ][ y0 ] | ae(v) | (6-4) |
| .... | | |
| } | | |

In the fifth embodiment of the present invention, the SDC mode flag is signaled only when the DBBP mode is not enabled and the DBBP mode flag is signaled only when the SDC mode is not enabled. The SDC mode flag and DBBP mode flag are signaled in CU or CU extension syntax. An example of CU extension syntax design according to the fifth embodiment is shown in Table 7, where the SDC mode flag is signaled before the DBBP mode flag. The signaling of the SDC mode flag as noted in statements (7-1) and (7-2) is the same as that in Table 6. For the DBBP mode flag signaling, a condition (i.e., the SDC mode being enabled) in addition to that of Table 6 is included. The conditions and DBBP mode flag signaling are noted in statements (7-3) and (7-4) respectively.

TABLE 7

| cu_extension( x0 , y0 , log2CbSize ) {  | Descriptor | Note |
|---|---|---|
|   if (icEnableFlag ) | | |
|     ic_flag | ae(v) | |
|   if ( rpEnableFlag ) | | |
|     iv_res_pred_weight_idx | ae(v) | |
|   if( sdcEnableFlag && !pcm_flag[ x0 ][ y0 ] ) | | (7-1) |
|     sdc_flag[ x0 ][ y0 ] | ae(v) | (7-2) |
|   if( depth_based_blk_part_flag[ nuh_layer_id ] | | (7-3) |
|     && CuPredMode[ x0 ][ y0 ] != | | |
|     MODE_INTRA) | | |
|     && !sdc_flag[ x0 ][ y0 ]) | | |
|     dbbp_flag[ x0 ][ y0 ] | ae(v) | (7-4) |
|   .... | | |
| } | | |

In the sixth embodiment, the SDC mode and PCM mode are prohibited to be enabled in a same processing block, such as the same CTU (coding tree unit), CTB (coding tree block), CU or PU (prediction unit). When the SDC mode flag is set to 1, the PCM mode flag shall be 0. On the other hand, when the PCM mode flag is set to 1, the SDC mode flag shall be 0.

In the seventh embodiment, the DBBP mode and PCM mode are prohibited to be enabled in a same processing block, such as the same CTU, CTB, CU or PU. When the DBBP mode flag is set to 1, the PCM mode flag shall be 0. On the other hand, when the PCM mode flag is set to 1, the DBBP mode flag shall be 0.

In the eighth embodiment, the DBBP mode and SDC mode are prohibited to be enabled in a same processing block (which could be CU, CTU, CTB, or PU). When the DBBP mode flag is set to 1, the SDC mode flag shall be 0. On the other hand, when the SDC mode flag is set to 1, the DBBP mode flag shall be 0.

In the ninth embodiment, only one of the DBBP mode, SDC mode and PCM mode can be enabled in a same processing block, such as the same CTU, CTB, CU or PU. When any one of the DBBP mode flag, SDC mode flag, and PCM mode flag is set to 1, the remaining two flags shall be 0.

In current 3D-HEVC, Inter SDC, Intra SDC, and DMM have been developed to improve the depth coding efficiency. Inter SDC and Intra SDC are performed with the same concept. However, Intra SDC is enabled and disabled according to vps_depth_modes_flag, which also controls DMM including all DMM modes (e.g. DMM 1 and DMM4).

In the tenth embodiment of the present invention, a flag for all DMM modes is used and a unified enabling flag for Inter SDC and Intra SDC in VPS (video parameter set) is used.

To provide flexibility, in the eleventh embodiment of the present invention, separate DMM mode enabling flags in VPS (e.g., one DMM1 enabling flag and one DMM4 enabling flag in VPS). Furthermore, two separate flags can also be signaled in VPS to indicate the enabling of Inter SDC and Intra SDC respectively. Note that, these flags as describe above can also be signaled in different levels such as slice header, picture parameter set (PPS), or sequence parameter set (SPS).

In the twelfth embodiment, a flag is signaled in a high level such as VPS or other high level (e.g., SPS or PPS) to indicate the enabling of DBBP. The flag may also be used to indicate the enabling of other tools which need to fetch the depth pixel data of the inter-view reference picture for texture picture (e.g., DoNBDV, VSP).

Another aspect of the present invention is related to the initial probabilities in initial CABAC step for DBBP flag. For example, the initial probabilities for B-slice/picture, P-slice/picture, and I-slice/picture can all be set to unsigned character value 161 as shown below.

```
static const UChar
    INIT_DBBP_FLAG[3][DBBP_NUM_FLAG_CTX] =
{
    { 161 },
    { 161 },
    { 161 },
}.
```

While, the initial probabilities in initial CABAC step for DBBP flag are 161 for B-slice/picture, P-slice/picture, and I-slice/picture, other probability values may also be used. For example, the values for B-slice/picture, P-slice/picture, and I-slice/picture can all be 162, 192, or 176. In yet another example, the values for B-slice/picture, P-slice/picture, and I-slice/picture can also be different. For example, the values for B-slice/picture, P-slice/picture, and I-slice/picture can be 192, 176 and 176 respectively.

Figure 6:
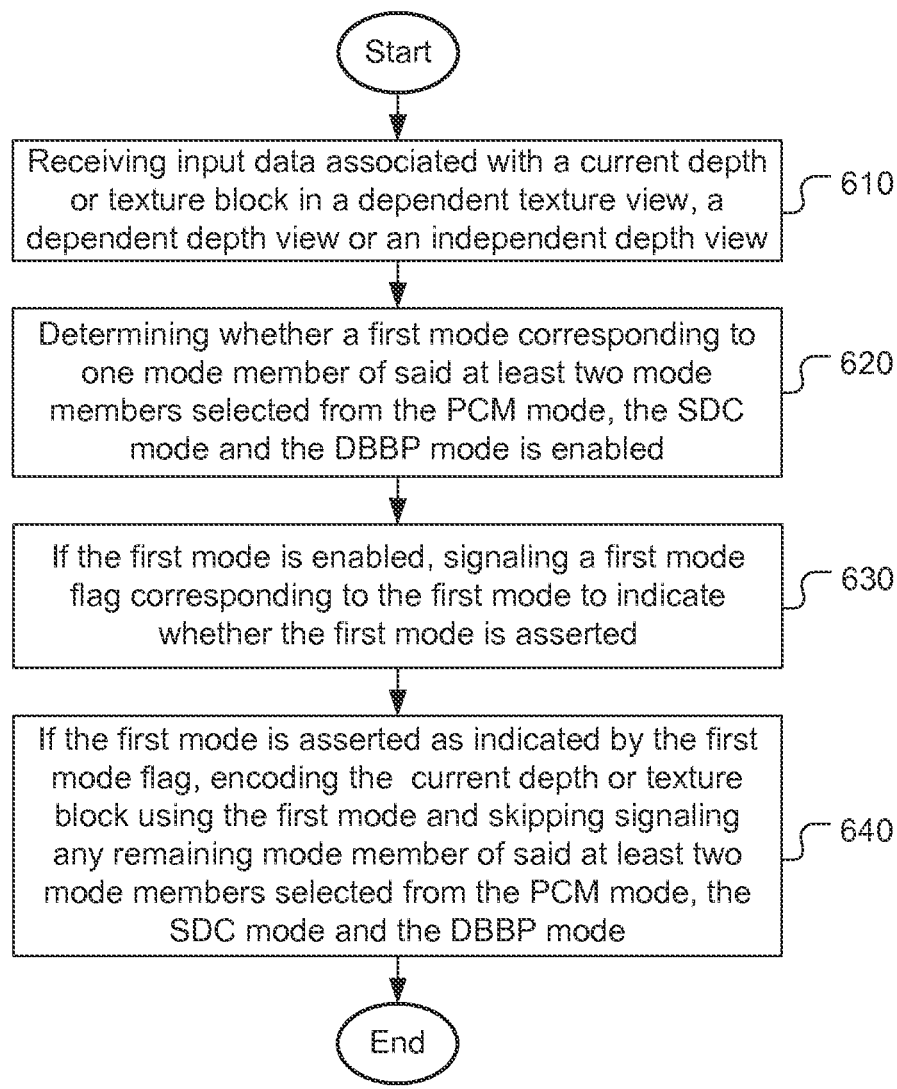
FIG. 6 illustrates a flowchart of an exemplary coding system incorporating an embodiment of the present invention to signal one or more coding modes selected from a mode group for multi-view or three-dimensional (3D) video coding.

FIG. 6 illustrates a flowchart of an exemplary coding system incorporating an embodiment of the present invention to signal one or more coding modes selected from a mode group for multi-view or three-dimensional (3D) video coding, wherein the mode group comprises a pulse code modulation (PCM) mode, a segment-wise depth coding (SDC) mode and a depth-based block partitioning (DBBP) mode. The system receives input data associated with a current depth or texture block in a dependent texture view, a dependent depth view or an independent depth view as shown in step 610. The input data may be retrieved from memory (e.g., computer memory, buffer (RAM or DRAM) or other media) or from a processor. A first mode corresponding to one mode member of said at least two mode members selected from the PCM mode, the SDC mode and the DBBP mode checked regarding whether it is enabled in step 620. If the first mode is enabled, a first mode flag corresponding to the first mode is signaled to indicate whether the first mode is asserted in step 630. If the first mode is asserted as indicated by the first mode flag, the current depth or texture block is coded using the first mode and signaling of any remaining mode member of said at least two mode members selected from the PCM mode, the SDC mode and the DBBP mode is skipped in step 640.

The flowchart shown above is intended to illustrate examples of mode signaling according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of signaling one or more coding modes selected from a mode group for multi-view or three-dimensional (3D) video coding, wherein the mode group comprises a pulse code modulation (PCM) mode, a segment-wise depth coding (SDC) mode and a depth-based block partitioning (DBBP) mode, the method comprising:
receiving, by a video coding device, input data associated with a current depth or texture block in a dependent texture view, a dependent depth view or an independent depth view;
determining, by the video coding device, whether the first mode is enabled, wherein the first mode corresponds to one mode member of at least two mode members selected from the PCM mode, the SDC mode and the DBBP mode;
if the first mode is enabled, signaling, by the video coding device, a first mode flag corresponding to the first mode to indicate whether the first mode is asserted; and
if the first mode is asserted as indicated by the first mode flag, encoding, by the video coding device, the current depth or texture block using the first mode and skipping signaling of any remaining mode member of said at least two mode members.

2. The method of claim 1, wherein the current depth or texture block corresponds to a coding tree block (CTB), a coding tree unit (CTU), a coding unit (CU) or a prediction unit (PU).

3. The method of claim 1, wherein the current depth or texture block corresponds to a current depth or texture coding unit (CU).

4. The method of claim 1, wherein said at least two mode members correspond to the PCM mode and the SDC mode.

5. The method of claim 4, wherein the first mode corresponds to the SDC mode.

6. The method of claim 5, wherein the first mode flag is signaled in coding unit (CU) syntax.

7. The method of claim 6, wherein a second mode flag corresponding to the PCM mode is signaled in the CU syntax if the PCM mode is enabled and the first mode flag is not asserted.

8. The method of claim 4, wherein the first mode corresponds to the PCM mode.

9. The method of claim 8, wherein the first mode flag is signaled in coding unit (CU) syntax.

10. The method of claim 9, wherein a second mode flag corresponding to the SDC mode is signaled in CU extension syntax if the SDC mode is enabled and the first mode flag is not asserted.

11. The method of claim 1, wherein said at least two mode members correspond to the DBBP mode and the SDC mode.

12. The method of claim 1, wherein said at least two mode members correspond to the DBBP mode and the PCM mode.

13. The method of claim 1, wherein said at least two mode members correspond to the DBBP mode and the PCM mode.

14. The method of claim 1, wherein said at least two mode members correspond to the SDC mode, the PCM mode and the DBBP mode.

15. The method of claim 14, wherein the first mode corresponds to the PCM mode and the first mode flag is signaled in coding unit syntax.

16. The method of claim 15, wherein a SDC mode flag is signaled in CU extension syntax if the first mode flag is not asserted and the SDC mode is enabled.

17. The method of claim 16, wherein a DBBP mode flag is signaled in the CU extension syntax if the current depth or texture block is not Intra coded.

18. The method of claim 16, wherein a DBBP mode flag is signaled in the CU extension syntax if the current depth or texture block is not Intra coded and the SDC mode flag is not asserted.

19. The method of claim 1, wherein said at least two mode members include the DBBP mode, and a DBBP mode enable flag is signaled in video parameter set (VPS), picture parameter set (PPS) or sequence parameter set (SPS).

20. An apparatus for signaling one or more coding modes selected from a mode group for multi-view or three-dimensional (3D) video coding, wherein the mode group comprises a pulse code modulation (PCM) mode, a segment-wise depth coding (SDC) mode and a depth-based block partitioning (DBBP) mode, the apparatus comprising one or more electronic circuits configured to:
receive input data associated with a current depth or texture block in a dependent texture view, a dependent depth view or an independent depth view;
determine whether a first mode is enabled, wherein the first mode corresponds to one mode member of at least two mode members selected from the PCM mode, the SDC mode and the DBBP mode;
if the first mode is enabled, signal a first mode flag corresponding to the first mode to indicate whether the first mode is asserted; and
if the first mode is asserted as indicated by the first mode flag, encode the current depth or texture block using the first mode and skipping signaling any remaining mode member of said at least two mode members.

21. A method of signaling one or more coding modes selected from a mode group for multi-view or three-dimensional (3D) video coding, wherein the mode group comprises a pulse code modulation (PCM) mode, a segment-wise depth coding (SDC) mode and a depth-based block partitioning (DBBP) mode, the method comprising:

receiving, by a video coding device, input data associated with a current depth or texture block in a dependent texture view, a dependent depth view or an independent depth view;

determining, by the video coding device, whether a first mode is enabled, wherein the first mode corresponds to one mode member of at least two mode members selected from the PCM mode, the SDC mode and the DBBP mode;

if the first mode is enabled, signaling, by the video coding device, a first mode flag to indicate whether the first mode is asserted; and if the first mode is asserted as indicated by the first mode flag, encoding, by the video coding device, the current depth or texture block using the first mode and disabling any remaining mode of said at least two mode members.

22. The method of claim 21, wherein the current depth or texture block corresponds to a coding tree block (CTB), a coding tree unit (CTU), a coding unit (CU) or a prediction unit (PU).

23. The method of claim 21, wherein the current depth or texture block corresponds to a current depth or texture coding unit (CU).

24. The method of claim 21, wherein said at least two mode members correspond to the PCM mode and the SDC mode.

25. The method of claim 24, wherein the first mode corresponds to the PCM mode.

26. The method of claim 24, wherein the first mode flag is signaled in coding unit (CU) syntax.

27. The method of claim 24, wherein a second mode flag corresponding to the SDC mode is signaled to be disabled (prohibited to be enabled) in the CU syntax if the PCM mode is enabled.

28. An apparatus for signaling one or more coding modes selected from a mode group for multi-view or three-dimensional (3D) video coding, wherein the mode group comprises a pulse code modulation (PCM) mode, a segment-wise depth coding (SDC) mode and a depth-based block partitioning (DBBP) mode, the apparatus comprising one or more electronic circuits configured to:

receive input data associated with a current depth or texture block in a dependent texture view, a dependent depth view or an independent depth view;

determine whether a first mode is enabled, wherein the first mode corresponds to one mode member of at least two mode members selected from the PCM mode, the SDC mode and the DBBP mode;

if the first mode is enabled, signal a first mode flag corresponding to the first mode to indicate whether the first mode is asserted; and if the first mode is asserted as indicated by the first mode flag, encode the current depth or texture block using the first mode and signaling any remaining mode member of said at least two mode members to be disabled.

* * * * *